2,952,663

ESTERS AND METHODS AND STEPS OF MAKING AND USING THE SAME

David Wasserman, Irvington, N.J., assignor to Minnesota Mining and Manufacturing Company, St. Paul, Minn., a corporation of Delaware No Drawing. Filed Apr. 18, 1957, Ser. No. 653,510

1 Claim. (Cl. 260—46)

This invention relates to materials and to methods for producing them and also to novel compositions and articles of manufacture in which one or more of them is a component. In one of its more specific aspects the invention is directed to materials consisting essentially of esters derived from certain starting materials. Each of said starting materials is hereinafter designated as "Product C" and is a resinous organic reaction product produced by reacting an alkenyl phenol, which may be in monomeric or polymeric form and hereinafter designated as "Reactant A" with a phenol-reactive aldehyde and hereinafter designated as "Reactant B." By the term "phenol-reactive aldehyde" as employed herein to define Reactant B, I mean aldehydes as well as aldehyde donors. For improved yields and for increasing the speed of said reaction, it is preferably carried out in the presence of an alkaline or acidic catalyst or condensing agent. Product C may be a thin or heavy liquid or a solid or semisolid but in all cases is capable of being dissolved in an equal volume of a mixture of 50 parts of toluene to 50 parts of n-butanol.

According to this invention, I have produced materials consisting essentially of esters of the various starting materials, Products C, by reacting Product C with various organic compounds, hereinafter designated as "Reactants E," to replace the hydrogen atoms of the phenolic hydroxy groups thereof with acyl groups. These novel materials, hereinafter designated as "Products D" have unusual properties in that they are hydrophobic and soluble in all proportions in V.M. and P. naphtha and in the presence of metallic driers are capable of being air dried or baked to provide flexible, dry, hard films having excellent water, chemical and solvent resistance, and are practically free of vesicant action.

Reactant A is a phenol having on its nucleus an unsaturated hydrocarbon substituent of 14–28 carbon atoms, with the unsaturation due to one or more ethylenic linkages, and said nucleus may or may not be further substituted in one other aldehyde reactive position and in any case has on its nucleus two open aldehyde reactive positions. Said phenol may be in either the monomeric or polymeric state, and in all cases is soluble in an equal volume of 50 parts of toluene and 50 parts of n-butanol. Reactant A may be shown in empirical formula as $(R \cdot C_6H_3OH \cdot X)_n$ in which R is said unsaturated hydrocarbon substituent, $n$ is a whole number of 1 or more and its maximum value is determined by the aforesaid solubility factor and X may be hydrogen or a substituent such as hydroxyl, aryloxy, alkoxy, alkenyl, alkyl, acyl, aryl, acetoxy, aralkyl, halogen, sulphydryl, carboxy, amino, alkamino, dialkamino, acetamino, methylol, cycloalkyl, carbalkoxy, keto, thio ketone, alkenoxy, acetylene, alkinyl, alkenecarboxy, thiocarboxy, etc. Some of these specific Reactants A may be obtained from the Anacardiaceae family of plants and from other sources and others may be derived therefrom or may be synthetically produced. Some of the specific Reactants A are cashew nut shell liquid, either treated or untreated by the methods known to the art for removing the sulphur, metal and nitrogeneous components therefrom and if desired heated to remove 0–10% by weight of the more readily volatizable materials therefrom, cardanol, anacardic acid, cardol, 4-amino cardanol, urushiol, bhilawanol, renghol, ginkgolic acid, bilobol, ginkgol gutarenghol, laccol, thitsial, Pelandjauic acid, cyclogallipharic acid as well as the polymers of these various phenols.

Some illustrative examples of Reactant B which may be used alone or in combination are: aliphatic aldehydes and their self polymers such as formaldehyde, paraformaldehyde, trioxane, acetaldehyde, paraldehyde and higher homologues of acetaldehyde up to twenty carbon atoms; alkenyl aldehydes up to 20 carbon atoms such as acrolein, polyacrolein, methyacrolein, crotonaldehyde, citronellal and citral; aromatic aldehydes such as benzaldehyde, naphthaldehyde, salicyclaldehyde, ortho-, meta- or paratolualdehyde, ortho-, meta- or parachlorobenzaldehyde, valillin, ortho-, meta- or para-hydroxy or alkoxy benzaldehyde; heterocyclic aldehydes such as furfuraldehyde, methyl furfuraldehyde; polyaldehydes such as glyoxal and phenyl glyoxal, polyglyoxal; aralkylaldehydes such as phenyl acetaldehyde, hydrocinnamaldehyde and cinnamaldehyde; halogen substituted aldehydes such as chloral or bromal; alkoxy, aryloxy, aralkyloxy substituted aliphatic aldehydes; aldehyde donors such as hexamethylene tetramine, methylol or polymethylol derivatives of phenols, cresols and naphthols; also acetals and formals, etc.

Reactant E in general is an organic compound which will react with the phenolic hydroxy groups of the starting material, Product C, to replace the hydrogen atoms of the phenolic hydroxy groups of Product C with an acyl group. By employing certain specific Reactants E, the esters are produced.

The following are illustrative examplese of some of the Reactants E: Aliphatic carboxylic acids and their anhydrides, acid chlorides, esters; ketene; alkyl ketones; phosgene; alkenyl, aralkyl, cycloalkyl, aryl acid anhydrides and acid chlorides; and poly acid anhydrides and acid chlorides; mono and poly halogen, nitro, alkoxy, carbalkoxy, keto derivatives of alkyl, alkenyl, aralkyl, cycloalkyl and aryl acid anhydrides, acid chlorides and poly acid anhydrides and poly acid chlorides; heterocyclic acid anhydrides and acid chlorides. Specific examples of such reagents are furoyl chloride, pyridine acid chloride, thiophene acid chlorides, acetic anhydride, acetyl chloride, ethyl acetate, ketene, methyl ketene, etc.

According to this invention a quantity of (C) is mixed with a quantity of (E) an esterifying agent, such as an aliphatic carboxylic acid, its anhydride, acid chloride or ester, with the mole ratio of (C) to (E) being 1 mole of (C) to at least 1 and general 1–1.2 moles of (E). Such mixture is reacted with or without the use of external heat and/or a catalyst, depending upon the particular esterifying agent employed and the reaction is continued until at least 90% and generally 95–99+ percent of Product (C) hash become esterified at the available oxygen of the phenolic hydroxy thereof. In this manner, there is produced a reaction mass consisting essentially of a carboxylic ester of Product (C), with said ester measuring at least 90% of the weight of the reaction mass. That is to say, the reaction is continued until at least 90% and for most purposes 95–99+ percent of all of C in said mix is converted to the carboxylic ester. The esterification of course occurs at the oxygen of the phenolic hydroxy.

The novel materials of this invention can be used as drying oil upgraders, synthetic drying oils, and resin plasticizers for natural and synthetic rubbers, phenol-formaldehyde type resins. They can be used in varnish, paints and enamel formulations as a partial or total replacement of both resins and drying oils.

A unique and startling property of the novel materials of this invention derived from Product C of low order of aldehydic condensation, such as dimers, trimers and tetramers, for example, is that they are thin liquids that can be brushed on a surface without any additional thinning with solvents. Surprisingly, such novel materials, when in the form of thin liquids can be used directly after addition of manganese, lead, cobalt, etc. driers for spray or dipping application as an air dry, or forced air dry at higher temperatures, varnish without the accompanying fire and health hazards that are present when using solvent thinned varnishes, paints, enamels and other synthetic protective coating formulations. For example, the novel materials consisting essentially of esters of the cardanol-formaldehyde resins (3:2 mol. eq.) and other novel products of this invention are light amber colored liquids that after addition of driers form pale gold clear films that air dry in 90 minutes, and through which printed letters can be seen without any difficulty. Colors can be differentiated through these varnish films very easily as in the case of different colored lead wires in electrical motors, transformers and other equipment.

The dried coatings of the novel materials have excellent flexibility characteristics. This flexibility may, if desired, be increased by internal plasticization in three ways. One, by introducing a saturated long chain alkyl phenol such as the hydrogenated cardanol or wax phenols containing 14-30 carbon atoms in the saturated side chain in place of some of the unsaturated side chain anacardiac type phenol in the alkenyl phenol-aldehyde reaction; two, by introducing a longer chain aldehyde for a part or all of the formaldehyde; or three by increasing the length of the hydrocarbon chain in the ester forming reagent. Alternatively the hardness of these films may be increased by introducing phenol or cresols in place of a fraction of the anacardiaceae type phenols in the alkenyl phenol-aldehyde reaction process, by employing as Reactant E shorter hydrocarbon chain reagents such as phosgene or oxalyl chloride; or by using between one and two moles of the aldehyde along with increased reaction times and temperatures to yield high viscosity resins.

The novel materials of this invention may also be externally plasticized by addition of blown or unblown non-drying, semi-drying, or drying oils such as soyabean, linseed, oiticica, perilla, sardine, tung, cottonseed, dehydrated castor oils, etc.

The novel materials of this invention may be added to semi-drying oils to upgrade them by decreasing gelation time, drying time and increase their resistance to salt water, alkali, organic solvents and acids. They may also be coblown with oxygen or air with the semi-drying and drying fatty oils to give oils with better drying properties.

The novel materials of this invention especially those in the lower molecular weight range (less than 1000) can be used as rubber and synthetic rubber plasticizers. The double bonds in their structure can be cross vulcanized, using sulfur and sulfur containing compounds, with unsaturated linkages in the natural and synthetic rubbers. They may also be copolymerized with butadiene, styrene, chloroprene, acrylonitrile, isoprene, or any combination of these in the presence of peroxide, peroxide redox systems, or sodium to give internally plasticized rubbers.

Completion of esterification which characterizes the present invention accomplishes two things. First, I have noticed a marked decrease in color of the reaction mixture as the reaction reached completion and second the drying time was materially shortened as phenolic hydroxyl groups were acylated completely by the esterification reagent. The short dry-to-touch time, as short as 90 minutes in air for the higher molecular weight (above 1000) esters of this invention, and as much as 180 minutes for the lower molecular weight (about 600-1000) esters of this invention, was due to complete removal by reaction of the inhibiting free phenolic bodies. Addition of 1% or less free phenols, such as Guai-A-Phene anti-skinning agent, inhibited the drying time noticeable, but did not do so for more than four hours. This prevented skinning of the thinned varnishes after addition of driers.

The following examples are given merely by way of illustrating the invention and are not to be considered in a limiting sense. The various starting materials, Products C, may be best exemplified for the present purposes of illustration by cardanol-formaldehyde reaction product.

The cardanol used in the following examples to obtain light colored oils was a vacuum distilled product that boiled at 180-205° C. at 1 to 2 mm. from a commercial sample of heat extracted cashew nut shell liquid. It had an average of two double bonds in the 15 carbon straight chain in the meta position to the phenolic hydroxyl group and was of the following formula:

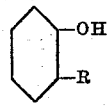

in which R is a normal olefinic substituent of 15 carbon atoms.

*Example I.—Heavy bodied cardanol-formaldehyde resin*

1200 grams (4 moles) cardanol
390 grams (4.8 moles) formalin 37%
20 grams ammonia 28%
1200 grams xylol Into a 5-liter three-neck flask equipped with stirrer, reflux condenser and thermometer was added the cardanol, formaldehyde and ammonia with stirring. This was refluxed two hours, then after adjusting the condenser for vacuum distillation the reaction mixture was dehydrated at 20 mm. pressure. The temperature of the mixture increased to 120° C. over a period of 3.5 hours and the viscosity measured on the Fluidmeter at 130° F. was 2.2 cm. This product is Product CI. The xylol was added with stirring to prevent gel formation.

*Example II.—Acetate of heavy bodied cardanol-formaldehyde resin*

(a) PYRIDINE-ACETIC ANHYDRIDE METHOD 104 grams (0.33 mole) cardanol-formaldehyde resin. Product CI in xylol (71 grams)
39.1 grams (0.495 mole) pyridine (1)
39.1 grams (0.495 mole) pyridine (2)
39.1 grams (0.495 mole) pyridine (3)
37.0 grams (0.363 mole) acetic anhydride (a)
20 grams (0.2 mole) acetic anhydride (b)
20 grams (0.2 mole) acetic anhydride (c)

The xylol solution of the resin, Product CI, was mixed with the pyridine (1) and the acetic anhydride (a) added with stirring. Temperature went up to 40° C. The mixture was heated to 100-110° C. for 1 hour, cooled to room temperature and pyridine (2) and acetic anhydride (b) added. The reaction mass was heated for one hour at about 110° C. and cooled. The third portions of pyridine (3) and acetic anhydride (c) were added. The flask was heated to 100-110° C. for two hours. The pyridine, xylol and acetic anhydride were removed in vacuo leaving a dark red colored liquid which is novel Product DIIa. containing more than 95% by weight of the acetate of Product CI.

(b) ALKALI-ACETIC ANHYDRIDE METHOD 104 grams (0.33 mole) Cardanol-formaldehyde resin, Product CI in 71 grams xylol
229 grams xylol
8.4 grams (0.15 mole) pot. hydroxide in 20 g. methanol (1)
16.8 grams (0.30 mole) pot. hydroxide in 40 g. methanol (2)
25.2 grams (0.45 mole) pot. hydroxide in 60 g. methanol (3)
15.3 grams (0.15 mole) acetic anhydride (a)
20.4 grams (0.20 mole) acetic anhydride (b)
20.4 grams (0.20 mole) acetic anhydride (c)

The xylol solution of Product CI was placed in a two-liter three-neck flask, further diluted with xylol and the potassium hydroxide (1) added with stirring. The methanol, water and 140 cc. xylol was distilled up to a pot. temperature of 135° C. at atmospheric pressure. After cooling to 60° C. the acetic anhydride (a) was added. The reaction mass was heated to 85° C. and kept there 30 minutes. The 140° cc. of xylol distilled was restored to the flask, potassium hydroxide (2) added at 50–60° C., methanol, water and xylol distilled up to 140° C. pot. temperature and cooled to 50° C. Acetic anhydride (b) was added, heated to 130–140° C. and kept there one half hour. After cooling to 50° C. potassium hydroxide solution (3) was added, xylol distilled until all water and methanol was removed from reaction mass and acetic anhydride (c) added. The liquid was heated one hour at 130–140° C. to complete the reaction. After washing with two 100 cc. portions of hot water, the xylol and residual water was removed by vacuum distillation to leave an amber colored liquid which is novel Product DIIb having quick drying properties, and containing more than 95% by weight of the acetate of Product CI.

Example III.—Benzoate of heavy bodied cardanol-formaldehyde resin 104 grams (0.33 mole) cardanol-formaldehyde resin, Product CI in 71 grams xylol
300 grams dioxane
28 grams (0.5 mole) pot. hydroxide in 60 cc. methanol
56 grams (0.4 mole) benzoyl chloride The solution of cardanol-formaldehyde resin Product CI in xylol was further diluted with dioxane in a two-liter 3-neck flask and the potassium hydroxide solution added and water, methanol and some dioxane and xylol removed with a Dean and Stark water separator. After removal of all the water, benzoyl chloride was added at 40° C. heated to 100° C. for 2 hours. Cooled, acidified to pH 5 with dilute hydrochloric acid and washed out salts using two 100 cc. portions of hot water. Dehydrated and removed all solvents by distillation in vacuo up to 120° C. to provide Product DIII. The acetyl value of the product was zero indicating complete reaction. Product DIII was a clear amber colored liquid with a viscosity of 25.7 cm./minute at 130° F. measured on the fluidmeter, and containing more than 95% by weight of the benzoate of Product CI.

A varnish made with Product DIII air dried tack free in 150 minutes. The varnish consisted of the following:

10 grams benzoate of cardanol-formaldehyde resin, Product DIII
0.25 gram manganese naphthenate
0.12 gram lead naphthenate
10 grams V. M. and P. naphtha It is also within the purview of this invention to provide urethanes and cyanurates of Products C. They may be produced by reacting Product C with mono and polyisocyanates, such as alkyl and aryl isocyanates, etc. and with cyanuric chloride, etc.

Of course, various other starting materials Products C and Reactants E besides those specifically set forth in the examples may be employed to provide other specific Products D. The various other Products C may be produced by following the general method described herein for producing Products CI and CII and by employing other phenol-reactive aldehydes and/or other of said alkenyl phenols in place of the cardanol. There are many examples known to the art of resins as defined by Product C herein, such as resinous reaction products of cashew nut shell liquid, cardol, cardanol, anacardic acid, etc. with formaldehyde, paraformaldehyde, hexamethylene tetramine, furfural, acetaldehyde, etc.

This application is a continuation-in-part of my co-pending application Ser. No. 243,371, filed August 23, 1951.

The general method which may be employed for the preparation of the urethane derivatives of Product C is very simple and may be effectuated by dissolving any of said Product C, such as Product CI, for example, in an inert organic solvent such as xylene to provide a fairly thin solution. Then, while said solution is constantly and continuously stirred, there is slowly added thereto, in a drop-wise fashion, a molar equivalent amount of a monoisocyanate as, for example, phenylisocyanate, after the last increment of the isocyanate has been added and about ten minutes thereafter the entire reaction mass is externally heated to a temperature of approximately 100° C. and maintained at said temperature for a period of approximately one hour to complete the reaction. The resultant mass consists essentially of a urethane derivative of Product C employed in said solvent. Said solution as such may be used with or without driers as a film forming material. The solvent may be driven off leaving behind a thin film of such a urethane derivative which when maintained at 100° C. will be converted to the substantially and unfusible state to provide a protective coating having excellent weather resistance, electrical insulating properties and good chemical resistance. Thus such urethanes find a special application in the field of coatings for paper, glass cloth, woven and matted fabrics, and also for electrical insulating.

The cyanurate derivatives may be produced by dissolving the Product C and an inert solvent, such as xylene, to provide a thin solution. This solution, while being constantly and continuously stirred, has added thereto a molar equivalent of sodium hydroxide dissolved in its weight of water. Then, after said addition has been made, the mass is heated to the boiling point of the solvent, using a Dean and Stark water trap to capture the water in the solvent distillate. Then a ⅓ mole proportion of cyanuric chloride dissolved in four times its weight of dioxane is added drop-wise to said substantially anhydrous mass, resulting in reaction, whereupon the cyanurate of Product C is produced and sodium chloride is a by-product. The entire mass is now filtered to separate the sodium chloride therefrom and the filtrate consists essentially of a solution consisting of the cyanurate of Product C in xylene and dioxane. This cyanurate may be employed for the same purposes as the urethane derivatives.

I claim:

The method for producing a composition of matter which is hydrophobic, soluble in V. M. and P. naphtha, practically free of vesicant action and in the presence of metallic driers being capable of air drying, at least 90% by weight of said composition of matter being an organic carboxylic acid ester at the phenolic hydroxy of (C) resinous reaction product of (B) a phenol-reactive aldehyde having a single reactive aldehyde group, and (A) a material soluble in an equal volume of a solvent consisting of 50 parts of toluene and 50 parts of n-butanol and selected from the group consisting of cashew nut shell liquid, homopolymers of cashew nut shell liquid, cardanol and homopolymers of cardanol, comprising reacting (1) a mass of (C) with (2) at least an equimolecular quantity of an organic carboxylic esterifying agent to esterify at least 90% of said (1), said esterifying agent selected from the group consisting of monomeric organic carboxylic acids, their chlorides, their esters and their anhydrides.

References Cited in the file of this patent

UNITED STATES PATENTS

| | | |
|---|---|---|
| 1,725,797 | Harvey | Aug. 27, 1929 |
| 2,143,880 | Hughes | Jan. 17, 1939 |
| 2,157,126 | Harvey | May 9, 1939 |
| 2,181,119 | Caplan | Nov. 28, 1939 |